Figure 4:
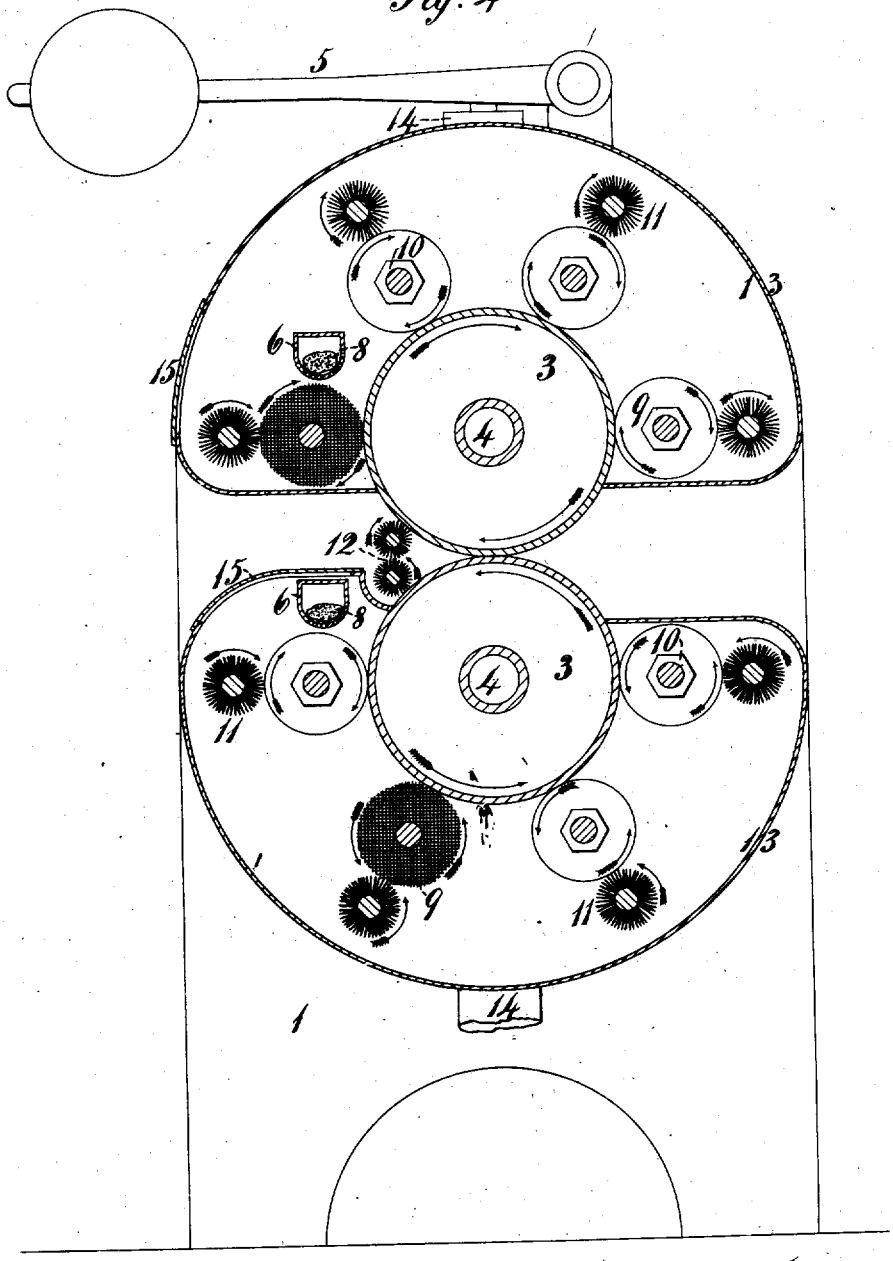

2 Sheets—Sheet 1.
J. MORRIS.
Machine for Finishing Printed Paper.
No. 7,919. Reissued Oct. 23, 1877.
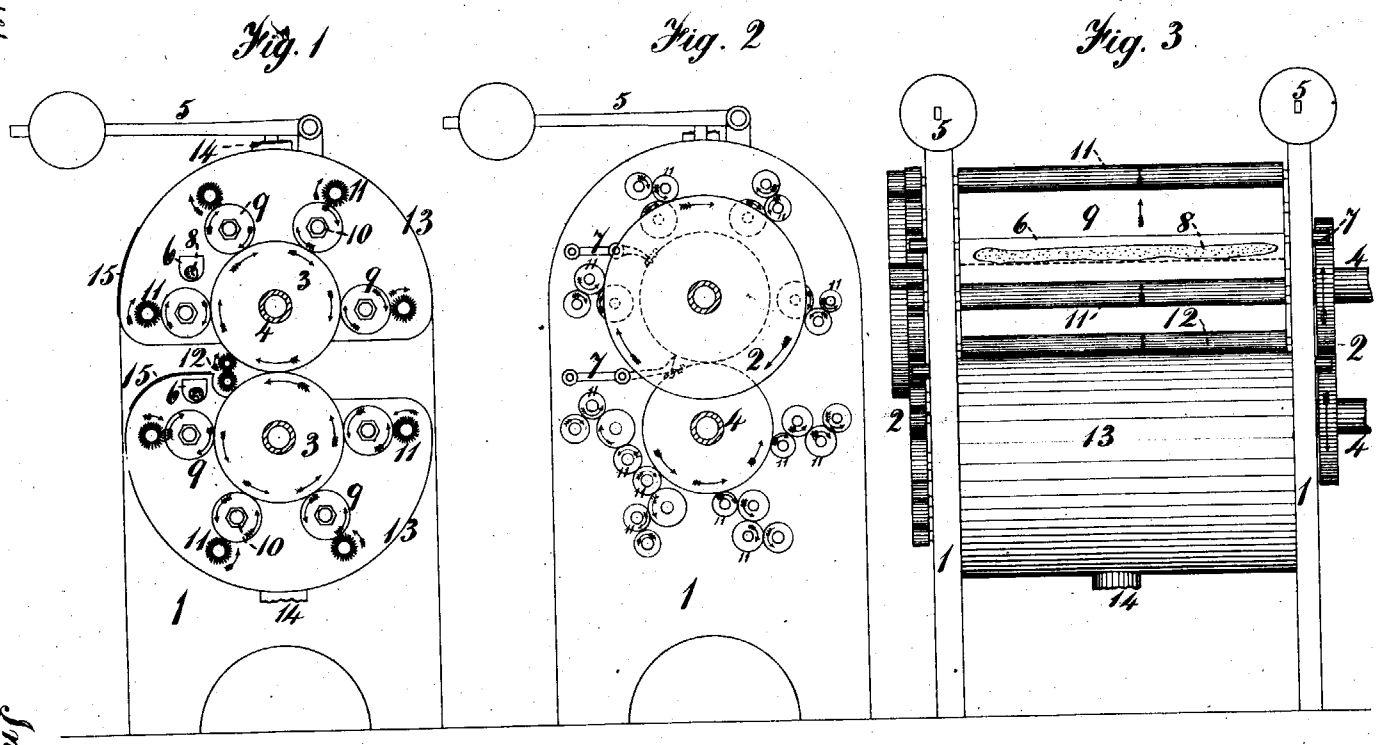
Witnesses
James Johnson
W. Johnson
Inventor
James Morris

J. MORRIS.

Machine for Finishing Printed Paper.

No. 7,919. Reissued Oct. 23, 1877.

Witnesses

James Johnson

W. F. Johnson

Inventor

James Morris

UNITED STATES PATENT OFFICE.

JAMES MORRIS, OF LIVERPOOL, ENGLAND.

IMPROVEMENT IN MACHINES FOR FINISHING PRINTED PAPER.

Specification forming part of Letters Patent No. 145,605, dated January 20, 1874; Reissue No. 7,919, dated October 23, 1877; application filed May 24, 1877.

*To all whom it may concern:*

Be it known that I, JAMES MORRIS, of Liverpool, in the county of Lancaster, England, have invented a new and useful Improvement in Machines for Finishing Printed Sheets of Paper, which improvement is fully set forth in the following specification, reference being had to the accompanying drawings.

The object of this invention is to provide a machine which shall be capable of finishing or giving a surface to printed sheets or lengths of paper or like material—that is to say, a machine in which printed sheets or lengths of paper or like material are passed through, between and in direct contact with heated rotating smooth rolls, called "set-off" rolls, whereby the ink liable to become set off is removed from the surface of the said printed sheets or lengths of paper, or like material, and whereby the said printed sheets or lengths are caused to have a smooth and finished appearance.

Figure 1 is an end view, one frame-plate being removed; Fig. 2, an end elevation; Fig. 3, an elevation of the delivery side, with the upper half of the casing removed; and Fig. 4, an enlarged view similar to Fig. 1, showing two buffing-rolls in section.

Like letters denote the same parts in all the views, and the arrows denote the direction of motion of the parts.

1, frame-work; 2, driving-gear; 3, smooth set-off rolls, made hollow, and heated by steam or hot air, which passes into the rolls 3 by the pipes 4. The pipes 4 enter the rolls through hollow trunnions, provided with stuffing boxes and glands to make the joints tight. 5, weighted lever for regulating the pressure between the set-off rolls 3; 6, perforated or open-work containers for whiting or other powdery matter, which is caused to fall therefrom in a shower by means of a vibrating motion given to such containers. By causing the said whiting or powdery matter to fall in a shower, the ink set off on the rollers is uniformly coated therewith. The containers are here shown operated by means of levers 7, which rest on the teeth of the wheels 2. It will be obvious that a cam-tappet, or like means, may be employed to give the vibrating motion to the said containers. The bags 8, made of textile or woven material, are employed to hold the whiting or powdery matter in the containers, so as to insure that the whiting or powdery matter which falls from the containers shall be of sufficient fineness. 9, buffing-rolls made of disks of calico or like fabric, bound closely together by the nut-clamps 10. The said buffing-rolls are caused to rotate in contact with the set-off rolls, and in the opposite direction thereto at the surfaces of contact.

I prefer that in all cases the surface-speeds of the buffing-rolls should be greater than the surface-speeds of the set-off rolls.

11 are rotating brushes employed for cleaning and brushing off the whiting or powdery matter from the buffing-rolls 9. The said brushes are made to rotate at a greater surface-speed than the surface-speed of the buffing-rolls. I prefer that they should rotate at the surfaces of contact in the opposite direction thereto.

12 are take-off rolls or brushes for carrying the leading edges of the sheets or lengths of paper or like material passing through the machine, away from the set-off rolls 3 onto the delivery-board, or its equivalent. The said take-off rolls or brushes are specially useful when highly-sized damp paper is passed between or being finished by the rolls.

13 are casings, provided with pipes 14, which lead to an exhaust-fan or its equivalent, for the purpose of drawing away the dusty matter which would otherwise come in contact with, and adhere to, the surfaces of the set-off rolls 3, or pervade the atmosphere of the printing-office; 15, feeding and examining doors.

I claim—

1. The set-off rollers 3, capable of being heated, in combination with buffing-rollers 9, operating substantially as and for the purpose set forth.

2. The set-off rollers 3, capable of being heated, in combination with buffing-rollers 9 and cleaning-brushes 11, operating substantially as and for the purposes set forth.

3. Set-off rollers 3, capable of being heated, in combination with buffing-rolls 9, cleaning-brushes 11, and perforated or open-work vibrating containers 6, carrying whiting or other powdery matter, all operating substantially as and for the purpose set forth.

4. The process of preparing the set-off roll for continuous use, consisting in showering whiting or other powdery matter on the surface of the roll, substantially as specified.

5. The combination, with an open-work vibrating container, of a bag of textile or woven fabric for containing the powdery substance used to coat the set-off roll, substantially as specified.

6. In a machine for finishing printed sheets, the rotating buffing-roll, constructed of disks of calico or like fabric, bound closely together by nut-clamps, substantially as specified.

7. In combination with the set-off rolls, the take-off devices, substantially as described, for carrying the leading edges of the sheets away from the set-off rolls, substantially as specified.

8. In a machine for finishing printed sheets, the combination of the set-off rolls capable of being heated, and adapted to remove the surplus ink from a printed sheet, relief mechanism, substantially as described, for regulating the pressure of the rolls upon the printed surface, and devices for applying whiting or like substance to and removing the same, together with the ink, from the set-off rolls, substantially as specified.

JAMES MORRIS.

Witnesses:
JAMES JOHNSON,
W. B. JOHNSON.